(12) United States Patent
Holmes

(10) Patent No.: US 6,648,153 B2
(45) Date of Patent: Nov. 18, 2003

(54) SUPPLY CABINET

(75) Inventor: William Holmes, San Diego, CA (US)

(73) Assignee: SupplyPro, Inc., San Diego, CA (US)

(*) Notice: Subject to any disclaimer, the term of this patent is extended or adjusted under 35 U.S.C. 154(b) by 0 days.

(21) Appl. No.: 10/000,466

(22) Filed: Oct. 23, 2001

(65) Prior Publication Data

US 2002/0175606 A1 Nov. 28, 2002

Related U.S. Application Data

(60) Provisional application No. 60/242,417, filed on Oct. 23, 2000.

(51) Int. Cl.[7] .................................................. A47F 7/00
(52) U.S. Cl. .................... 211/85.15; 211/12; 211/85.29; 211/94.02; 248/95
(58) Field of Search ................................ 211/12, 85.15, 211/85.29, 187, 94.01, 94.02; 248/95

(56) References Cited

U.S. PATENT DOCUMENTS

| | | | |
|---|---|---|---|
| 3,798,810 A | * | 3/1974 | Brisson et al. |
| 4,717,042 A | | 1/1988 | McLaughlin |
| 4,785,969 A | | 11/1988 | McLaughlin |
| 4,793,495 A | * | 12/1988 | Preu .......................... 211/94.01 |
| 4,832,290 A | * | 5/1989 | Baglio |
| 4,893,727 A | | 1/1990 | Near |
| 4,896,024 A | | 1/1990 | Morello et al. |
| 4,953,745 A | | 9/1990 | Rowlett, Jr. |
| 4,967,906 A | | 11/1990 | Morello et al. |
| 4,998,630 A | * | 3/1991 | Schwartz ................. 211/71.01 |
| 5,014,875 A | | 5/1991 | McLaughlin et al. |
| 5,047,948 A | | 9/1991 | Turner |
| 5,067,630 A | | 11/1991 | Nesser et al. |
| 5,084,828 A | | 1/1992 | Kaufman et al. |
| 5,126,957 A | | 6/1992 | Kaufman et al. |
| 5,190,185 A | | 3/1993 | Blechl |
| 5,242,464 A | | 9/1993 | Armstrong et al. |
| 5,263,596 A | | 11/1993 | Williams |
| 5,267,174 A | | 11/1993 | Kaufman et al. |
| 5,314,243 A | | 5/1994 | McDonald et al. |
| 5,329,459 A | | 7/1994 | Kaufman et al. |
| 5,337,253 A | | 8/1994 | Berkovsky et al. |
| 5,346,297 A | | 9/1994 | Colson, Jr. et al. |
| 5,377,864 A | | 1/1995 | Blechl et al. |
| 5,392,951 A | | 2/1995 | Gardner et al. |
| 5,394,993 A | * | 3/1995 | Gravell et al. ................. 211/12 |
| 5,431,299 A | | 7/1995 | Brewer et al. |
| 5,434,775 A | | 7/1995 | Sims et al. |
| 5,445,294 A | | 8/1995 | Gardner et al. |
| 5,460,294 A | | 10/1995 | Williams |
| 5,467,949 A | * | 11/1995 | Lemke |
| 5,520,450 A | | 5/1996 | Colson, Jr. et al. |
| 5,564,803 A | | 10/1996 | McDonald et al. |
| 5,603,417 A | * | 2/1997 | Blair |
| 5,661,978 A | | 9/1997 | Holmes et al. |
| 5,713,485 A | | 2/1998 | Liff et al. |
| 5,716,114 A | | 2/1998 | Holmes et al. |
| 5,745,366 A | | 4/1998 | Higham et al. |
| 5,755,341 A | * | 5/1998 | Spamer ...................... 211/59.2 |
| 5,769,269 A | | 6/1998 | Peters |
| 5,797,515 A | | 8/1998 | Liff et al. |
| 5,801,628 A | | 9/1998 | Maloney |
| 5,805,455 A | | 9/1998 | Lipps |

(List continued on next page.)

FOREIGN PATENT DOCUMENTS

| | | |
|---|---|---|
| WO | WO 99/08241 | 2/1999 |

*Primary Examiner*—Robert W. Gibson, Jr.
(74) *Attorney, Agent, or Firm*—Michael Best & Friedrich LLP

(57) ABSTRACT

A supply cabinet with inventory sensors in a bore/slot arrangement. The supply cabinet contains a plurality of vertically adjustable shelves. Each shelf has a plurality of bore/slot arrangements extending from the front to the rear of the shelf. Each bore/slot arrangement secures a plurality of containers, which are suspended from a lower surface of the shelf.

20 Claims, 3 Drawing Sheets

U.S. PATENT DOCUMENTS

| | | |
|---|---|---|
| 5,805,456 A | 9/1998 | Higham et al. |
| 5,832,459 A | 11/1998 | Cameron et al. |
| 5,842,976 A | 12/1998 | Williamson |
| 5,883,806 A | 3/1999 | Meador et al. |
| 5,905,653 A | 5/1999 | Higham et al. |
| 5,927,540 A | 7/1999 | Godlewski |
| 5,940,306 A | 8/1999 | Gardner et al. |
| 5,953,706 A | 9/1999 | Patel |
| 5,963,919 A | 10/1999 | Brinkley et al. |
| 5,964,359 A * | 10/1999 | Marino .................. 211/85.29 |
| 5,971,273 A | 10/1999 | Vallaire |
| 5,983,200 A | 11/1999 | Slotznick |
| 5,983,202 A | 11/1999 | Yabe et al. |
| 5,997,928 A | 12/1999 | Kaish et al. |
| 6,003,006 A | 12/1999 | Colella et al. |
| 6,011,999 A | 1/2000 | Holmes |
| 6,012,041 A | 1/2000 | Brewer et al. |
| 6,021,392 A | 2/2000 | Lester et al. |
| 6,039,467 A | 3/2000 | Holmes |
| 6,065,819 A | 5/2000 | Holmes et al. |
| 6,068,156 A | 5/2000 | Liff et al. |
| 6,075,441 A | 6/2000 | Maloney |
| 6,108,588 A | 8/2000 | McGrady |
| 6,148,291 A | 11/2000 | Radican |

\* cited by examiner

SUPPLY CABINET

CROSS-REFERENCE TO RELATED APPLICATIONS

This application claims priority under 35 U.S.C. §119 to U.S. provisional patent application No. 60/242,417, filed on Oct. 23, 2000.

FIELD OF THE INVENTION

The invention relates to a supply cabinet, and more particularly, to a supply cabinet that is configurable to accommodate different items being dispensed from the cabinet.

SUMMARY OF THE INVENTION

The invention provides a supply cabinet having therein adjustable shelves. The shelves have therein a plurality of elongate bores and intersecting slots. The bore/slot arrangements are adapted to secure a container such as flexible bag containing a product. However, other containers can also be used with the bore/slot arrangements. A sensor arrangement senses when a bag is slidingly removed from a bore/slot arrangement within a shelf.

Other features and advantages of the invention will become apparent to those of ordinary skill in the art upon review of the following detailed description and drawings.

DETAILED DESCRIPTION OF THE PREFERRED EMBODIMENT

Figure 1:
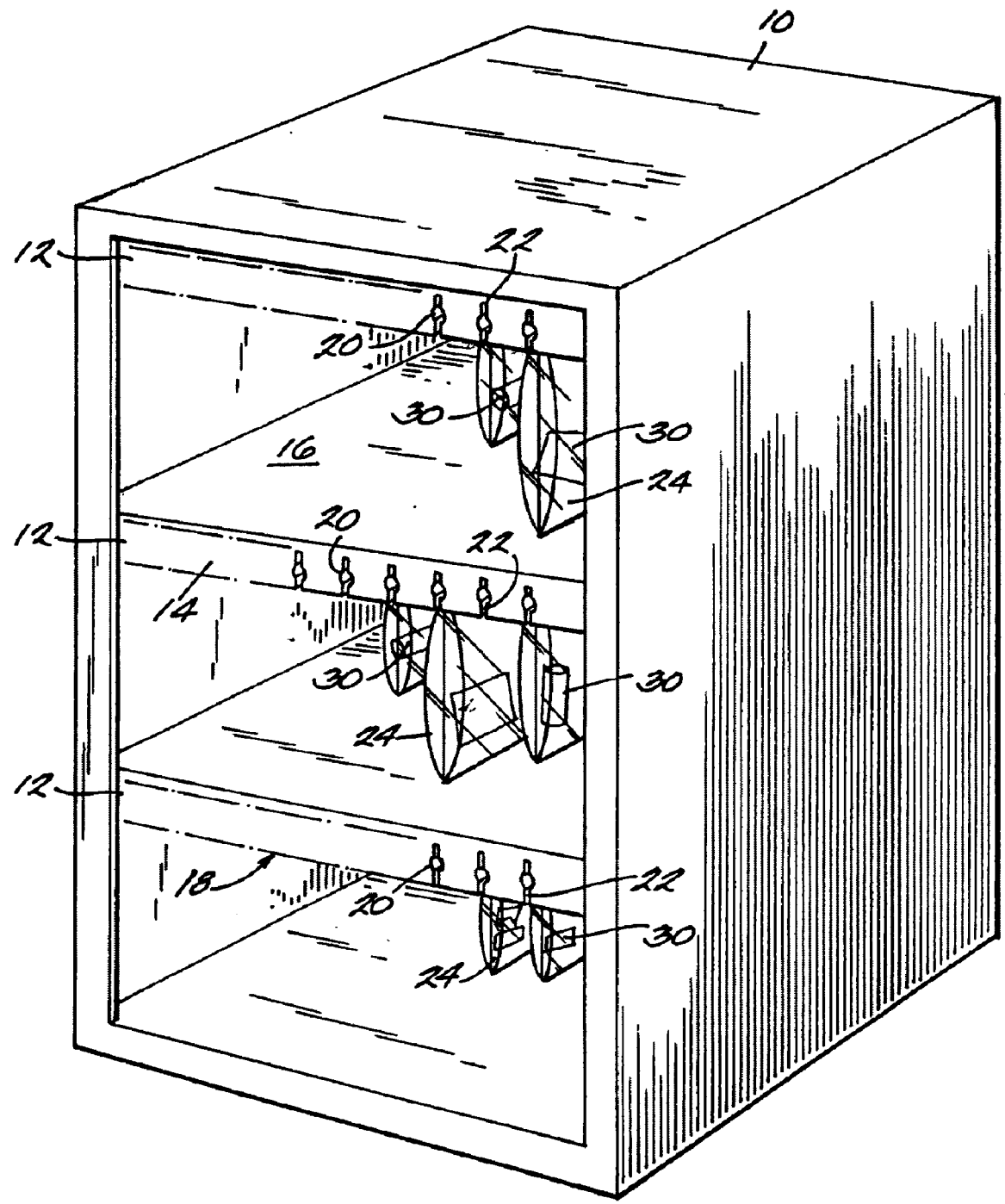
FIG. 1 is a perspective view of a supply cabinet in accordance with the present invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 2:
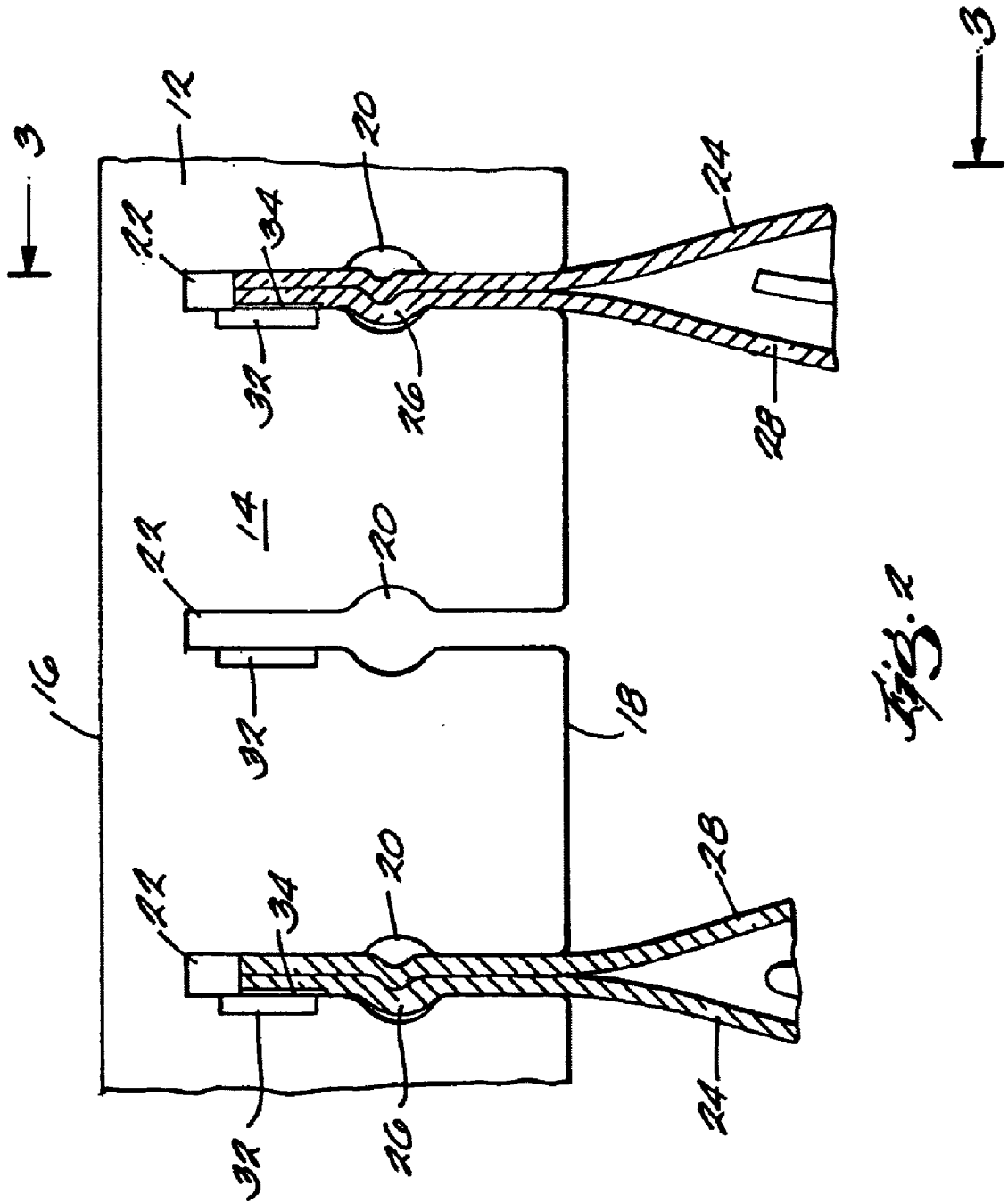
FIG. 2 is a front view of a front edge of a shelf of the supply cabinet of FIG. 1 showing a plurality of bore/slot arrangements in the shelf and a plurality of containers suspended from the bore/slot arrangements.
Figure 3:
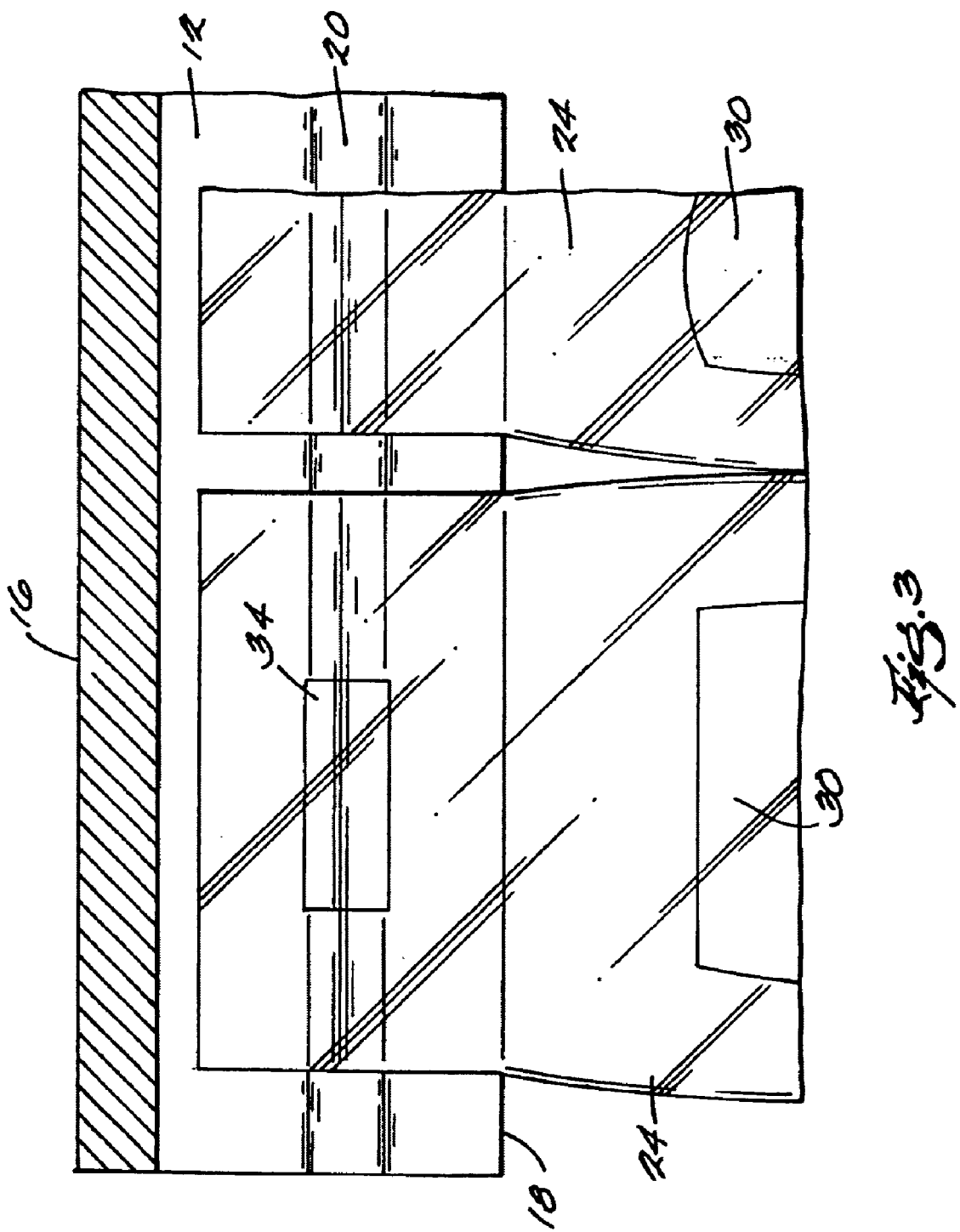
FIG. 3 is a side view of the shelf of FIG. 2 taken along line 3—3 of FIG. 2 showing one of the containers and part of another container suspended from one of the bore/slot arrangements of FIG. 2.

Referring to FIGS. 1–3, a supply cabinet 10 in accordance with the present invention includes a plurality of adjustable shelves 12, each having a front edge 14, a rear edge (hidden from view), an upper surface 16, and a lower surface 18. Each shelf 12 is preferably comprised of a plate of aluminum having a thickness of approximately one inch. However, it should be noted that other materials and other thicknesses can also be used. Each shelf 12 is supported in the cabinet 10 such that the vertical position of an individual shelf is adjustable and such that the spacing between the shelves 12 can be varied to accommodate items of various sizes therebetween, as will be explained in more detail below.

Each shelf 12 is provided with a plurality of elongate, spaced-apart, bores or holes 20 extending from the front edge 14 of a respective shelf 12 rearwardly to the rear edge. Preferably, the bores 20 are ¼ inch in diameter. However, again, it will be readily understood by those of ordinary skill in the art that other diameters can also be used depending upon the items being dispensed. The bores are preferably positioned equidistant between the upper and lower surfaces 16, 18, respectively, of a shelf 12. Further, in one form of the invention, each shelf 12 has a width of 22 inches and includes 16 bores 20 spaced apart along the width of the shelf 12.

Each shelf 12 also includes slots 22 cut into the shelf 12 and extending through or intersecting a respective bore 20. The slots 22 are preferably parallel to one another and preferably do not extend through the upper surface 16 of the shelf 12. The slots and bores both open through the lower surface 18 of the shelf 12 and the front edge 14 of the shelf 12. In the preferred form of the invention, each slot 22 has a width of 0.030 inch.

The slot/bore arrangement 20/22 is intended to house a portion of a container 24. Preferably, each bore/slot arrangement 20/22 is designed to house and support multiple containers 24 along the bore/slot arrangements length, such that the containers 24 are suspended from the bore/slot arrangement 20/22. Each bore/slot arrangement 20/22 could support a particular item or, alternatively, containers 24 housing different types of items could be supported by one bore/slot arrangement 20/22.

Preferably, the container 24 is recloseable and includes an upper closure portion 26 positioned in the bore 20 with the remainder 28 of the container 24 depending through a respective slot 22 and being held in suspension between adjacent shelves 12. Preferably, the container 24 is a flexible, transparent, recloseable, plastic bag. However, other embodiments of containers 24 can also be utilized with the bore/slot arrangement 20/22. For example, in addition to, or in place of, the flexible bag, a container such as a metal clam shell can be employed. The clam shell includes a hinge at its lower edge and a bead along its upper edge to be positioned in a slot 22. The clam shell would provide a secure, tamper-resistant, housing for an item or items supplied by the cabinet. Other materials such as various plastics or fiberglass could similarly be used to provide containers 24 having greater strength than a flexible bag.

Items 30 to be dispensed are housed in the containers 24. Depending upon the size and application of the items 30, each container 24 could hold one item 30 or a plurality of the same or different items 30. For example, containers could be used to store kits or multiple component products, liquids or multiple parts. Further, to minimize cost, the containers 24 could also be designed to be reusable.

To keep track of the containers 24, and therefore items 30, removed from the cabinet 10, a sensor 32 is provided in each bore/slot arrangement at the front edge 14 of each shelf 12. Each sensor 32 is designed to detect removal of a container 24 from a bore/slot arrangement of a shelf 12. Preferably, each container 24 includes two optically readable labels 35 coupled near the upper closure portion or bead 26 of the container 24. The labels 35 are spaced apart, one near each end of the container 24. In this way, as the container 24 is removed from or placed into the cabinet 24, the sequence in which the labels 35 (e.g., opaque labels) pass the sensor 32 (e.g., a light beam) indicates whether the container 24 is being removed from or placed into a particular bore/slot arrangement. If like items are stored in containers within a particular bore/slot arrangement, the removal or replacement of a particular item is registered.

Alternatively, or in addition, each container 24 may include a label 34 having optically readable code or indicia (e.g., a bar code). A respective sensor 32 (e.g., a bar code scanner), can be used to sense the label 34 as it slides past the sensor 32 at the front edge 14 of the shelf 12. The sensor 32 would, therefore, know the type, quantity and specific item 32 removed from a shelf 12. It should be noted that other sensing approaches can also be used to detect removal of a container 24 from a shelf 12. For example, the containers 24 could have thereon smart chips, whereby removal of the container 24 from the cabinet 10 could be recorded by an RF antenna.

Each sensor 32 counts respective containers 24 removed from the cabinet 10. This can be a deterrent to theft of items 30 from the cabinet 10, maintain an accurate inventory of the items 30 in the cabinet 10, etc. As mentioned above, the cabinet 10 and sensors 32 can also be configured to permit the return of items 30 to the cabinet 10, while maintaining an accurate inventory count of each of the items 30.

The cabinet 10 of the present invention is adaptable to dispense items 30 of various sizes. The width of each shelf 12 from the front 14 to the rear edge can be varied to accommodate varying numbers of containers 24 in one respective bore/slot arrangement 20/22. Further, the number of bore/slot arrangements 20/22 per shelf 12 can be varied to accommodate the necessary distance needed between adjacent containers 24 to account for items 30 of different sizes. Furthermore, the spacing between adjacent shelves 12 can be varied to accommodate containers 24 of differing sizes between the adjacent shelves 12. All of this adjustability within the cabinet 10 maximizes the number of items 30 able to be housed in and dispensed from the cabinet 10, whether the items 30 are of the same or different size.

Although the invention has been described in detail with reference to certain preferred embodiments, variations and modifications exist within the scope and spirit of the invention as described and defined in the following claims.

What is claimed:

1. A supply cabinet comprising:
   a plurality of shelves, each having a front edge, a rear edge, an upper surface, and a lower surface;
   a plurality of elongated bores in each shelf, each bore having a length extending from the front edge toward the rear edge of the shelf, each bore being open at the front edge of the shelf and at the lower surface of the shelf and
   a container secured along an edge within the bore and suspended from the lower surface of the shelf.

2. The cabinet of claim 1, wherein the container is a transparent plastic bag.

3. The cabinet of claim 1, wherein the bore includes an optical sensor, which senses movement of the container within the bore.

4. The cabinet of claim 1, wherein the shelves are vertically adjustable.

5. The cabinet of claim 1, wherein each bore has a diameter of approximately 0.25 inches.

6. The cabinet of claim 1, wherein the container contains more than one type of item.

7. The cabinet of claim 1, further comprising a slot intersecting the bore to form a bore/slot arrangement, the slot having a width of approximately 0.030 inches.

8. The cabinet of claim 1, wherein the container includes two optically readable labels, the optically readable labels being spaced apart and coupled to the container in the proximity of an upper closure portion of the container, the upper closure portion being secured within the bore.

9. A supply cabinet comprising:
   a frame defining an interior;
   a plurality of adjustable shelves coupled within the interior, each shelf having a front edge, a rear edge, an upper surface, and a lower surface;
   a plurality of elongated bores extending into the shelves from the front edges of the shelves;
   a plurality of slots extending into the shelves from the front edges of the shelves, the slots intersecting the bores and opening through the lower surfaces of the shelves, the intersecting bores and slots defining a plurality of bore/slot arrangements; and
   a plurality of optical sensors coupled to the bore/slot arrangements.

10. The cabinet of claim 9, further comprising a container suspended from the bore/slot arrangement and having an optically readable label thereon.

11. The cabinet of claim 10, wherein the container comprises a transparent, recloseable, plastic bag, the bag being recloseable along an upper closure portion, the bag being secured to the shelf by sliding the upper closure portion of the bag into the bore/slot arrangement.

12. The cabinet of claim 10, wherein the container comprises a metal clam shell including a bead running along an edge of the clam shell, the bag being secured to the shelf by sliding the bead of the clam shell into the bore/slot arrangement.

13. A supply cabinet comprising:
   a plurality of adjustable shelves each having a front edge, a rear edge, an upper surface, and a lower surface;
   a plurality of slots having a length extending from the front edge toward the rear edge;
   a sensor in each slot; and
   a container suspended from at least one of the slots.

14. The cabinet of claim 13, wherein the plurality of shelves are vertically adjustable.

15. The cabinet of claim 13, wherein each slot further comprises an elongated bore of substantially the same length as the length of the slot, the bore also extending from the front edge toward the rear edge, thus forming a bore/slot arrangement.

16. The cabinet of claim 15, wherein the bore/slot arrangement extends through the lower surface of the shelf.

17. The cabinet of claim 15, wherein the container is suspended from the bore/slot arrangement and has an optically readable label thereon.

18. The cabinet of claim 13, wherein each shelf houses a specific type of item.

19. The cabinet of claim 13, wherein each slot has a width of approximately 0.030 inches.

20. The cabinet of claim 13, wherein the sensor senses removal and return of items.

* * * * *